(12) United States Patent
Koo et al.

(10) Patent No.: US 12,057,565 B2
(45) Date of Patent: Aug. 6, 2024

(54) JELLY-ROLL TYPE ELECTRODE ASSEMBLY HAVING ANODE IN WHICH ANODE MIXTURES CONTAINING ACTIVE MATERIAL WITH DIFFERENT COMPOSITION ARE FORMED ON BOTH SIDES OF ELECTRODE CURRENT COLLECTOR, SECONDARY BATTERY COMPRISING THE SAME, AND DEVICE COMPRISING SECONDARY BATTERY

(71) Applicant: LG CHEM, LTD., Seoul (KR)

(72) Inventors: Seongmo Koo, Daejeon (KR); Kwan Soo Lee, Daejeon (KR); Jaekyo Noh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 683 days.

(21) Appl. No.: 17/274,111

(22) PCT Filed: Jul. 28, 2020

(86) PCT No.: PCT/KR2020/009898
§ 371 (c)(1),
(2) Date: Mar. 5, 2021

(87) PCT Pub. No.: WO2021/020853
PCT Pub. Date: Feb. 4, 2021

(65) Prior Publication Data
US 2021/0359288 A1    Nov. 18, 2021

(30) Foreign Application Priority Data
Jul. 29, 2019  (KR) .......................... 10-2019-0091863

(51) Int. Cl.
*H01M 4/133*  (2010.01)
*H01M 4/02*   (2006.01)
(Continued)

(52) U.S. Cl.
CPC ........... *H01M 4/133* (2013.01); *H01M 4/364* (2013.01); *H01M 4/587* (2013.01);
(Continued)

(58) Field of Classification Search
CPC ...... H01M 4/133; H01M 4/364; H01M 4/587; H01M 50/531; H01M 50/46; H01M 10/0525; H01M 10/0587
(Continued)

(56) References Cited

U.S. PATENT DOCUMENTS

| 9,972,844 B2 | 5/2018 | Takahata et al. |
| 2008/0176140 A1 | 7/2008 | Nishiyama et al. |

(Continued)

FOREIGN PATENT DOCUMENTS

| CN | 107134578 A | 9/2017 |
| CN | 108701816 A | 10/2018 |

(Continued)

OTHER PUBLICATIONS

International Search Report (with partial translation) and Written Opinion dated Oct. 30, 2020, issued in corresponding International Patent Application No. PCT/KR2020/009898.
(Continued)

*Primary Examiner* — Sean P Cullen
(74) *Attorney, Agent, or Firm* — Morgan, Lewis & Bockius LLP (57) ABSTRACT

The present disclosure relates to a jelly-roll type electrode assembly in which a long sheet-type cathode and a long sheet-type anode are wound in a state where a separator is interposed between the cathode and the anode, wherein the anode is configured such that an anode mixture is formed on both sides of an anode current collector, and the anode current collector is configured such that when winding to form an electrode assembly, if a side that winds inward is
(Continued)

referred to a first side and a side that winds outward is referred to a second side, an active material of a first anode mixture coated on the first side contains 70 wt % or more artificial graphite as an active material based on the total weight of the active material, and an active material of a second anode mixture coated on the second side contains 70 wt % or more natural graphite as an active material based on the total weight of the active material.

15 Claims, 4 Drawing Sheets

(51) Int. Cl.
  *H01M 4/36* (2006.01)
  *H01M 4/587* (2010.01)
  *H01M 10/0525* (2010.01)
  *H01M 10/0587* (2010.01)
  *H01M 10/42* (2006.01)
  *H01M 50/46* (2021.01)
  *H01M 50/531* (2021.01)
(52) U.S. Cl.
  CPC ... *H01M 10/0525* (2013.01); *H01M 10/0587* (2013.01); *H01M 50/46* (2021.01); *H01M 50/531* (2021.01); *H01M 2004/027* (2013.01); *H01M 2010/4292* (2013.01)
(58) Field of Classification Search
  USPC .................................. 429/217, 231.8, 232
  See application file for complete search history.

(56) References Cited

U.S. PATENT DOCUMENTS

| | | | |
|---|---|---|---|
| 2011/0293977 | A1 | 12/2011 | Kim et al. |
| 2014/0186702 | A1 | 7/2014 | Takahata |
| 2014/0248528 | A1* | 9/2014 | Takahata ............... H01M 4/366 |
| | | | 429/156 |
| 2016/0133922 | A1 | 5/2016 | Uhm et al. |
| 2017/0005323 | A1 | 1/2017 | Lim et al. |
| 2017/0133682 | A1 | 5/2017 | Kang et al. |
| 2018/0337394 | A1* | 11/2018 | Matsui ............. H01M 10/0525 |
| 2019/0305308 | A1 | 10/2019 | Lee et al. |

FOREIGN PATENT DOCUMENTS

| | | | |
|---|---|---|---|
| EP | 3396745 | A2 | 10/2018 |
| JP | H09-180759 | A | 7/1997 |
| JP | 2004055425 | A * | 2/2004 |
| JP | 2009-064574 | A | 3/2009 |
| JP | 2009-070658 | A | 4/2009 |
| KR | 10-0393654 | B1 | 8/2003 |
| KR | 10-1089135 | B1 | 12/2011 |
| KR | 10-2014-0029677 | A | 3/2014 |
| KR | 10-2014-0072132 | A | 6/2014 |
| KR | 10-1592128 | B1 | 2/2016 |
| KR | 10-1599168 | B1 | 3/2016 |
| KR | 10-2018-0023688 | A | 3/2018 |
| KR | 10-2018-0035693 | A | 4/2018 |
| KR | 10-1929475 | B1 | 12/2018 |
| KR | 10-2019-0060719 | A | 6/2019 |
| WO | 2015/012640 | A1 | 1/2015 |

OTHER PUBLICATIONS

Office action dated Jul. 1, 2023 issued in corresponding Chinese Patent Application No. 202080004728.5.
Extended European Search Report issued by the European Patent Office dated Oct. 19, 2021 in a corresponding European Patent Application No. 20848577.1.
Office Action issued in Chinese Patent 202080004728.5 dated Mar. 28, 2024.

* cited by examiner

Comparative Example 1

Example 1

JELLY-ROLL TYPE ELECTRODE ASSEMBLY HAVING ANODE IN WHICH ANODE MIXTURES CONTAINING ACTIVE MATERIAL WITH DIFFERENT COMPOSITION ARE FORMED ON BOTH SIDES OF ELECTRODE CURRENT COLLECTOR, SECONDARY BATTERY COMPRISING THE SAME, AND DEVICE COMPRISING SECONDARY BATTERY

TECHNICAL FIELD

Cross Citation with Related Application(s)

This application claims the benefit of Korean Patent Application No. 10-2019-0091863 filed on Jul. 29, 2019 with the Korean Intellectual Property Office, the disclosure of which is incorporated herein by reference in its entirety.

The present disclosure relates to a jelly-roll type electrode assembly containing an anode in which anode mixtures containing an active material with a different composition are formed on both sides of an electrode current collector, a secondary battery including the same, and a device including the secondary battery

BACKGROUND ART

Recently, along with the increase of the technological development and demand for a mobile device, demand for a secondary battery capable of charging and discharging as an energy source rapidly increases, and accordingly, many researches of the battery capable of meeting a variety of needs are emerging. Further, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Therefore, an electric vehicle (EV), which can be driven only by a secondary battery, and a hybrid electric vehicle (HEV), which combines a conventional engine with a secondary battery, have been developed and some thereof have been commercialized. A nickel-metal hydride (Ni-MH) secondary battery has been mainly used as the power source of EV, HEV and the like. Recently, however, studies using lithium secondary batteries having high energy density, high discharge voltage and output stability have been actively conducted, and some thereof have been commercialized.

Such a lithium secondary battery may be classified based on the shape of a battery case into a cylindrical battery having an electrode assembly mounted in a cylindrical metal container, a prismatic battery having an electrode assembly mounted in a prismatic metal container, and a pouch-shaped battery having an electrode assembly mounted in a pouch-shaped case made of a laminated aluminum sheet.

Also, the electrode assembly mounted in the battery case is a power generating element, having a structure including cathodes, anodes, and separators respectively disposed between the cathodes and the anodes, which can be charged and discharged. The electrode assembly may be classified as a jelly-roll type electrode assembly configured to have a structure in which a long sheet-type cathode and a long sheet-type anode, to which active materials are applied, are wound in a state in which a separator is disposed between the cathode and the anode, a stacked type electrode assembly configured to have a structure in which a plurality of cathodes having a predetermined size and a plurality of anodes having a predetermined size are sequentially stacked in a state in which separators are disposed respectively between the cathodes and the anodes, or a stacked/folded type electrode assembly configured to have a structure in which a unit cell such as a full cell consisting of electrodes with different polarities on both sides (e.g., cathode-separator-anode) or a bi-cell consisting of electrodes with different polarities on both sides (e.g., cathode-separator-anode-separator-cathode) is wound in the state of being placed on a separation film.

Among the techniques described above, the jelly-roll type electrode assembly (hereinafter, "jelly-roll") has the characteristic of enabling easy manufacture and having high energy density per weight. With the expansion of the market for EVs and HEVs that use the jelly-roll as a power source, the demand for cylindrical secondary batteries is increasing rapidly.

Meanwhile, the cathode and the anode are generally manufactured by coating an electrode mixture containing an active material onto both sides of each current collector, and the wound side is a top side and the opposite side is a back side. At this time, the stress generated by winding can only be different between the top side and the back side.

However, conventionally, the active material with the same composition was coated onto the top side and the back side in accordance with loading. Specifically, in the case of an anode using a mixture of artificial graphite and natural graphite as an anode active material, there is a problem that the coating layer is detached from the side edge in the longitudinal direction on the back side.

In addition, the anode mixture thus detached acts as an impurity inside the secondary battery, which causes a problem of deteriorating the performance of the secondary battery.

Therefore, there is a great need for a jelly-roll type electrode assembly that solves the above-mentioned problems and has improved output, capacity, and life characteristics.

DETAILED DESCRIPTION OF THE INVENTION

Technical Problem

The present disclosure has been made to solve the above problems and other technical problems that have yet to be resolved.

Specifically, an object of the present disclosure is to provide an electrode assembly in which the anode of the jelly-roll type electrode assembly is configured such that the anode mixture containing an active material with a different composition are coated on both sides of an anode current collector, thereby preventing the anode mixture form being detached due to winding, and so improving the output, capacity, and life characteristics of the secondary battery including the same.

Another object of the present disclosure is to further solve problems such as lithium precipitation by adjusting a N/P ratio of the anode and the cathode, and so further maximize the effect.

Technical Solution

In order to achieve the above object, according to an embodiment of the present disclosure, there is provided a jelly-roll type electrode assembly in which a long sheet-type cathode and a long sheet-type anode are wound in a state where a separator is interposed between the cathode and the anode, wherein the anode is configured such that an anode mixture is formed on both sides of an anode current collector, and the anode current collector is configured such that when winding to form an electrode assembly, if a side that winds inward is referred to a first side and a side that winds outward is referred to a second side, an active material of a first anode mixture coated on the first side contains more artificial graphite than natural graphite, and an active material of a second anode mixture coated on the second side contains more natural graphite than artificial graphite.

That is, the jelly-roll type electrode assembly according to the present disclosure is configured such that, unlike the prior art, the anode mixture containing an active material with a different composition are coated on the first and second sides of an anode current collector, thereby increasing the adhesion of the anode mixture on the second side wound to the outside to the current collector and preventing the anode mixture from being detached from both sides, and so improving the output, capacity, and life characteristics of the secondary battery including the same.

Further, the first anode mixture and the second anode mixture may, in addition to the natural graphite and artificial graphite, further include, for example, carbon or graphite materials other than natural graphite and artificial graphite such as expanded graphite, carbon fiber, non-graphitizable carbon, carbon black, carbon nanotube, fullerene and activated carbon; metals alloyable with lithium such as Al, Si, Sn, Ag, Bi, Mg, Zn, In, Ge, Pb, Pd, Pt, or Ti, and compounds including such elements; composite materials of the metals or their compounds and the carbon and graphite materials; lithium-containing nitrides, and the like.

In this case, specifically, the active material of the first anode mixture may contain artificial graphite and natural graphite in a ratio of 61 to 99 wt %: 1 to 39 wt % on a weight basis, and the active material of the second anode mixture may contain artificial graphite and natural graphite in an amount of 1 to 39 wt %: 61 to 99 wt % on a weight basis.

More specifically, the active material of the first anode mixture may contain artificial graphite and natural graphite in an amount of 70 to 99 wt %: 1 to 30 wt % on a weight basis, and the active material of the second anode mixture may contain artificial graphite and natural graphite in a ratio of 1 to 30 wt %: 70 to 99 wt % on a weight basis. Most specifically, the active material of the first anode mixture contains artificial graphite and natural graphite in a ratio of 75 to 85 wt %: 15 to 25 wt % on a weight basis, and the active material of the second anode mixture may contain artificial graphite and natural graphite in a ratio of 15 to 25 wt %: 75 to 85 wt % on a weight basis.

More specifically, the active material contained in the first anode mixture and the second anode mixture may be composed of natural graphite and artificial graphite having the composition described above.

This is because artificial graphite has excellent output characteristics and life characteristics, while natural graphite has excellent adhesive strength. More specifically, the first anode mixture formed on the first side that winds inward experiences a less stress and thus causes less problem of detachment, so that it contains a large amount of artificial graphite having excellent output, capacity, and life characteristics. The second anode mixture formed on the second side that winds outward experiences a stronger stress, so that it can be easily detached. In consideration of these points, the conventional problems can be solved by containing a large amount of natural graphite having strong adhesive strength.

Here, the natural graphite exhibiting excellent adhesive strength can sufficiently secure the mechanically interlocking effect of adhesion between particles through a binder as the specific surface area increases, and so have a specific surface area of 2 $m^2/g$ to 8 $m^2/g$, specifically 2.1 $m^2/g$ to 4 $m^2/g$. On the other hand, the artificial graphite may have a specific surface area (BET) of 0.5 $m^2/g$ to 5 $m^2/g$, specifically 0.6 $m^2/g$ to 4 $m^2/g$.

The specific surface area may be measured by a BET (Brunauer-Emmett-Teller) method. For example, the specific surface area may be measured by a 6-point BET method according to a nitrogen gas adsorption-flow method using a porosimetry analyzer (Belsorp-II mini from Bell Japan Inc.).

A shape of the natural graphite is not limited, and the natural graphite may be flake graphite, vein graphite, or amorphous graphite, may specifically be vein graphite or amorphous graphite more specifically. When a contact area between natural graphite particles becomes large, an adhesion area is increased, and thus adhesive strength is improved. Therefore, it is preferable for a tap density or a bulk density of the natural graphite to be large and for a degree of crystal grain orientation of the natural graphite to exhibit anisotropy. Therefore, it may be amorphous graphite.

On the other hand, a shape of the artificial graphite is not limited, and the artificial graphite may be in a form of a powder, a flake, a block, a plate, or a rod. Specifically, the artificial graphite may be in a form of a flake or a plate and more particularly in a flake, because it is preferable for a moving distance of lithium ions to be shorter in order to exhibit the most excellent output characteristics and it is preferable for a degree of crystal grain orientation of the artificial graphite to exhibit isotropy in order to shorten a moving distance to an electrode direction. A tap density of the natural graphite may be 0.9 g/cc to 1.3 g/cc, specifically be 0.92 g/cc to 1.15 g/cc, and a tap density of the artificial graphite may be 0.7 g/cc to 1.1 g/cc, specifically 0.8 g/cc to 1.05 g/cc.

The tap density is obtained by adding 50 g of a precursor to a 100 cc tapping cylinder using a JV-1000 measuring instrument manufactured by COPLEY Co., an d then tapping the tapping cylinder 3,000 times.

When the tap density is too small outside of the above range, a contact area between particles may not be sufficient and characteristics of adhesive strength may be deteriorated, and when the tab density is too large exceeding the above range, there may be a problem that tortuosity of an electrode and wettability of an electrolyte are degraded so that the output characteristics during charging and discharging may be deteriorated, which is also not preferable.

Meanwhile, the first anode mixture and the second anode mixture may further include a conductive material and a binder.

The conductive material is a material that can be used in a general lithium secondary battery, and is not particularly limited as long as it has conductivity without causing a chemical change in a corresponding battery, and for example, carbon blacks such as carbon black, acetylene black, ketjen Black®, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

The binder is not limited as long as it is a component that assists in the binding between the active material and the conductive material and in the binding with the current collector. For example, the binder may be respectively selected from polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, a fluorine rubber, various copolymers thereof, and the like.

In this case, the conductive material and the binder may be, respectively, contained in an amount of 0.1% by weight to 30% by weight, specifically 0.5% by weight to 5% by weight, more specifically 1% by weight to 3% by weight, based on the total weight of the first anode mixture or the second anode mixture.

In this case, within the range of the above content, the binder may be included in the same amount in the first anode mixture and the second anode mixture, and may be included in different amounts, specifically, in a larger amount in the second anode mixture formed on the second side that winds outward.

Furthermore, each of the first anode mixture and the second anode mixture may optionally further include a filler.

The filler is optionally used as a component to inhibit cathode expansion. The filler is not particularly limited so long as it is a fibrous material that does not cause chemical changes in the corresponding secondary battery. Examples of the filler include olefin-based polymers such as polyethylene and polypropylene; and fibrous materials such as glass fiber and carbon fiber.

The anode current collector is generally formed to a thickness of 3 to 200 μm. The anode current collector is not particularly limited so long as it has high conductivity while a chemical change is not caused in the corresponding battery, and for example, may be made of copper, stainless steel, aluminum, nickel, titanium, baked carbon, or a material formed by surface-treating a surface of copper or stainless steel with carbon, nickel, titanium, silver, or the like, or aluminum-cadmium alloys. Further, similar to the cathode current collector, the anode current collector may also have fine protrusions and depressions at a surface thereof to increase adhesion of the anode active material. In addition, the anode current collector may be used in various forms such as a film, a sheet, a foil, a net, a porous body, a foaming body, and a non-woven fabric structure.

Further, at least one of the first side and the second side of the anode may be formed of an uncoated portion to which the anode mixture is not coated on the anode current collector, and an anode tab may be attached to the uncoated portion.

The anode tab may be attached by ultrasonic fusion, but the method is not limited thereto, and various tab attachment techniques may be applied.

The uncoated portion may be formed at a wound starting point or a longitudinal direction intermediate portion at both side edges in the longitudinal direction of the sheet-type anode, and the position thereof is not limited and may be variously selected.

On the other hand, the cathode may have a structure in which a cathode mixture containing a cathode active material, a conductive material, and a binder is formed on both sides of a cathode current collector, respectively.

Similarly to the anode, the cathode may also be configured such that a cathode mixture including a cathode active material having a different composition is formed on both sides of the cathode current collector. In this case, an active material having more excellent adhesive strength may be included on a side that winds outward, similar to the anode. it goes without saying that a cathode mixture including a cathode active material having the same composition may be formed.

The cathode current collector is generally formed to a thickness of 3 to 200 μm. The cathode current collector is not particularly limited so long as it has conductivity while a chemical change is not caused in the corresponding battery, and for example, may be made of stainless steel, aluminum, nickel, titanium, sintered carbon, and a material formed by surface-treating a surface of aluminum or stainless steel surface with carbon, nickel, titanium, silver, or the like. Specifically, aluminum may be used. The current collector may have fine protrusions and depressions at a surface thereof to increase adhesion of the cathode active material, and may be used in various forms such as a film, a sheet, a foil, a net, a porous body, a foaming body, and a non-woven fabric structure.

The cathode active material may be, for example, a layered compound such as lithium cobalt oxide ($LiCoO_2$) or lithium nickel oxide ($LiNiO_2$) or a compound substituted with one or more transition metals; lithium manganese oxides such as chemical formula $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01 to 0.3); lithium manganese composite oxide represented by chemical formula $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a part of Li of chemical formula substituted with an alkaline earth metal ion; a disulfide compound; $Fe_2(MoO_4)_3$, and the like, but is not limited thereto.

Specific types of the conductive material and the binder are as described in the anode, and the content thereof in each cathode mixture may be 0.1 to 30% by weight, specifically, 0.5 to 5% by weight, and more specifically, 1 to 3% by weight, based on the total weight of the cathode mixture.

Meanwhile, the binder may be contained in the same amount in each of the cathode mixtures formed on both sides of the cathode current collector, and may be contained in a larger amount in the cathode mixture formed on the side that winds outward.

Further, it goes without saying that the cathode mixture may further include a filler, as described in the anode.

Further, an uncoated portion to which the cathode mixture is not coated may be formed on either one side or both sides of the cathode current collector, and a cathode tab may be attached to the uncoated portion.

The cathode tab may be attached by ultrasonic fusion, but the method is not limited thereto, and various tab attachment techniques may be applied.

The uncoated portion may be formed at a wound starting point or a longitudinal direction intermediate portion at both side edges in the longitudinal direction of the sheet-type cathode, and the position thereof is not limited and may be variously selected.

As the long sheet-type separator interposed between the cathode and the anode, an insulating thin film having high ion permeability and mechanical strength is used. The separator typically has a pore diameter of 0.01 to 10 μm and a thickness of 5 to 300 μm. As the separator, sheets or non-woven fabrics made of an olefin-based polymer such as polypropylene; glass fiber or polyethylene, which have chemical resistance and hydrophobicity, are used. When a solid electrolyte such as a polymer is employed as the electrolyte, the solid electrolyte may also serve as both the separator and electrolyte.

Meanwhile, the N/P ratio of the electrode assembly manufactured as described above may be 1 or more (N/P ratio 1). In detail, the N/P ratio may be 1 or more and 1.5 or less ($1 \leq$ N/P ratio $\leq 1.5$).

The N/P ratio is a capacity ratio per unit area of the anode and the cathode, and may be calculated as (capacity per unit area of the anode)/(capacity per unit area of the cathode)× 100.

The capacity per unit area of the electrode refers to a value obtained by dividing a theoretical discharge capacity (mAh) for each electrode in the battery by an electrode area ($cm^2$).

According to the present disclosure, as the N/P ratio is controlled within the above range, it is possible to prevent deterioration of life characteristics due to precipitation of lithium on the anode and increase the stability of the secondary battery.

When the capacity ratio per unit area of the anode and the cathode is outside the above range and the N/P ratio is 1 or less, deterioration of the service life occurs due to lithium precipitation and it poses a serious threat to safety.

The N/P ratio can be adjusted by adjusting the capacity per unit area of the anode and the capacity per unit area of the cathode. For example, the N/P ratio may be satisfied by adjusting the area ratio and the thickness ratio of each anode mixture, and the specific surface area of the active material.

Specifically, the cathode may have a capacity per unit area of the cathode mixture formed on one side of the cathode current collector from 4.300 $mAh/cm^2$ to 4.400 $mAh/cm^2$, and the anode may have a capacity per unit area of the anode mixture formed on one side of the anode current collector from 4.500 $mAh/cm^2$ to 4.600 $mAh/cm^2$.

According to the present disclosure, there is provided a secondary battery having a structure in which the jelly-roll type electrode assembly is mounted in a cylindrical or prismatic metal battery case in a state of being impregnated with a lithium-containing non-aqueous electrolyte. That is, the secondary battery may be a lithium secondary battery.

The lithium-containing non-aqueous electrolyte is composed of a non-aqueous electrolyte and a lithium salt.

As examples of the non-aqueous electrolyte, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

If necessary, an organic solid electrolyte, an inorganic solid electrolyte, or the like may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$.

In addition, for the purpose of improving charge and discharge characteristics, flame retardancy and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas.

The structure of the cylindrical or prismatic metal battery case is known in the art, and therefore a detailed description thereof will be omitted.

The lithium secondary battery may be used as a power source for a device, and the device may be selected from the consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are known in the art, and therefore a detailed description thereof will be omitted.

Advantageous Effects

As set forth above, the jelly-roll type electrode assembly according to the present disclosure is manufactured by forming an anode mixture containing an active material with a different composition on both sides of an anode current collector, specifically, an anode mixture containing a large amount of artificial graphite on the first side that winds inward, and containing a large amount of natural graphite on the second side that winds outward are formed, respectively, thereby preventing the outer anode mixture from being detached, and exhibiting the effect of improving the output, capacity, and life of the secondary battery including the same.

In addition, the N/P ratio of the anode and the cathode can be adjusted, thereby preventing deterioration of the life due to lithium precipitation, and securing safety.

DETAILED DESCRIPTION OF THE EMBODIMENTS

In the following, embodiments of the present disclosure will be described with reference to the accompanying figures, but these are for a better understanding of the present disclosure, and the scope of the present disclosure is not limited thereto.

Figure 1:
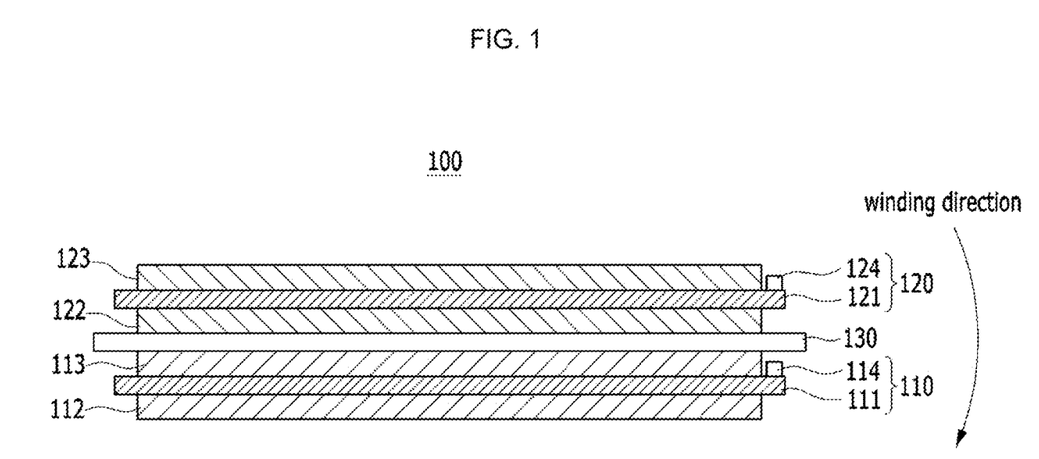
FIG. 1 is a schematic diagram of a vertical cross-sectional view of a jelly-roll type electrode assembly according to one embodiment of the present disclosure before winding.

FIG. 1 is a schematic diagram showing a jelly-roll type electrode assembly (hereinafter, "jelly-roll") according to one embodiment of the present disclosure before winding.

Referring to FIG. 1, the jelly-roll type electrode assembly 100 according to the present disclosure has a structure that is wound in the direction of arrow in a state where a separator 130 is interposed between a sheet-type cathode 110 and a sheet-type anode 120.

The cathode 110 includes cathode mixtures 112 and 113 formed on both sides of a cathode current collector 111, and the anode 120 includes anode mixtures 122 and 123 formed on both sides of an anode current collector 121.

Here, the anode 120 includes a first anode mixture 122 coated on a first side, which is a side that winds inward, and a second anode mixture 123 coated on the second side, which is a side that winds outward, based on a winding direction, that is, a reeling direction.

At this time, the first anode mixture 122 contains 70% by weight or more of artificial graphite as an active material based on the total weight of the active material, and the second anode mixture 123 contains 70% by weight or more of natural graphite based on the total weight of the active material as an active material. In addition, the anode 120 is configured such that an uncoated portion where the anode mixture is not coated is formed on at least either one side of the first side or the second side of the anode current collector 121, and an anode tab 124 is attached to the uncoated portion. Similarly to the anode 120, the cathode 110 is also configured such that an uncoated portion where the cathode mixture is not coated is formed on one side of the cathode current collector 111, and a cathode tab 114 is attached to the uncoated portion The jelly-roll type electrode assembly 100 having the structure shown in FIG. 1 is wound in the direction of arrow, that is, reeled, so that the jelly-roll type electrode assembly having a wound structure is completed.

Hereinafter, the present disclosure will be described in more detail by way of examples, but the following examples are for illustrative purposes only, and the scope of the present disclosure is not limited thereto.

Preparation Example 1

Preparation of Cathode Mixture $LiNi_{1/3}Mn_{1/3}Co_{1/3}O_2$ as a cathode active material, a conductive material (carbon black) and a binder (PVdF) were respectively added in a weight ratio of 97:1.5:1.5 to NMP (N-methyl-2-pyrrolidone), and then mixed to prepare a cathode mixture.

Preparation Example 2

Preparation of Anode Mixture

As the anode active material, a mixture of artificial graphite and natural graphite in a ratio of 30 wt %:70 wt % was used, and the mixture, a conductive material (carbon black), and a binder (PVdF) were added in a weight ratio of 98:1:1 to NMP (N-methyl-2-pyrrolidone), and then mixed to prepare an anode mixture.

Preparation Example 3

Preparation of Anode Mixture

As the anode active material, a mixture of artificial graphite and natural graphite in a ratio of 10 wt %:90 wt % was used, and the mixture, a conductive material (carbon black), and a binder (PVdF) were added in a weight ratio of 98:1:1 to NMP (N-methyl-2-pyrrolidone), and then mixed to prepare an anode mixture.

Preparation Example 4

Preparation of Anode Mixture

As the anode active material, a mixture of artificial graphite and natural graphite in a ratio of 20 wt %:80 wt % was used, and the mixture, a conductive material (carbon black), and a binder (PVdF) were added in a weight ratio of 98:1:1 to NMP (N-methyl-2-pyrrolidone), and then mixed to prepare an anode mixture.

Preparation Example 5

Preparation of Anode Mixture

As an anode active material, a mixture of artificial graphite and natural graphite in a ratio of 90 wt %:10 wt % was used, and the mixture, a conductive material (carbon black), and a binder (PVdF) were added in a weight ratio of 98:1:1 to NMP (N-methyl-2-pyrrolidone), and then mixed to prepare an anode mixture.

Preparation Example 6

Preparation of Anode Mixture

As the anode active material, a mixture of artificial graphite and natural graphite in a ratio of 80 wt %:20 wt % was used, and the mixture, a conductive material (carbon black), and a binder (PVdF) were added in a weight ratio of 98:1:1 to NMP (N-methyl-2-pyrrolidone), and then mixed to prepare an anode mixture.

Preparation Example 7

Preparation of Anode Mixture

As an anode active material, a mixture of artificial graphite and natural graphite in a ratio of 70 wt %:30 wt % was used, and the mixture, a conductive material (carbon black), and a binder (PVdF) were added in a weight ratio of 98:1:1 to NMP (N-methyl-2-pyrrolidone), and then mixed to prepare an anode mixture.

Preparation Example 8

Preparation of Anode Mixture

As the anode active material, a mixture of artificial graphite and natural graphite in a ratio of 50 wt %:50 wt % was used, and the mixture, a conductive material (carbon black), and a binder (PVdF) were added to NMP (N-methyl-2-pyrrolidone) at a weight ratio of 98:1:1, and then mixed to prepare an anode mixture.

Example 1

Manufacture of Cathode

The cathode mixture prepared in Preparation Example 1 was coated on both sides of a 15 μm-thick aluminum foil at a loading amount of 4.320 mAh/cm$^2$, and then rolled and dried to manufacture a cathode.

Manufacture of Anode

The anode mixture prepared in Preparation Example 3 was coated on one side of a 10 μm-thick copper foil at a loading amount of 4.566 mAh/cm$^2$, and the anode mixture prepared in Preparation Example 5 was coated on the opposite side of the copper foil at a loading amount of 4.566 mAh/cm$^2$, and then rolled and dried to manufacture an anode.

Manufacture of Jelly-Roll Type Electrode Assembly

A long sheet-type separator of polyethylene was interposed between the anode and the cathode, and as shown in FIG. 1, a jelly-roll type electrode assembly was manufactured by winding so that the side on which the anode mixture prepared in Preparation Example 5 was formed was wound so as to be the wound inner side.

Manufacture of Secondary Battery

The jelly-roll type electrode assembly was mounted in a cylindrical battery case, and ethyl carbonate, dimethyl carbonate, and ethylmethyl carbonate were mixed at a volume ratio of 1:1:1, while 1 M LiPF$_6$ was contained as a lithium salt. The non-aqueous electrolyte thus obtained was added to manufacture a cylindrical secondary battery.

Example 2

The anode mixture prepared in Preparation Example 4 was coated on one side of a 10 μm-thick copper foil at a loading amount of 4.566 mAh/cm$^2$, and the anode mixture prepared in Preparation Example 6 was coated on the opposite side of the copper foil at a loading amount of 4.566 mAh/cm$^2$, and then rolled and dried to manufacture an anode. A jelly-roll type electrode assembly was manufactured by winding so that the side on which the anode mixture prepared in Preparation Example 6 was formed was wound so as to be the wound inner side. In a subsequent step, a cylindrical secondary battery was manufactured in the same manner as in Example 1.

Example 3

The anode mixture prepared in Preparation Example 2 was coated on one side of a 10 μm-thick copper foil at a loading amount of 4.566 mAh/cm$^2$, and the anode mixture prepared in Preparation Example 7 was coated on the opposite side of a copper foil at a loading amount of 4.566 mAh/cm$^2$, and then rolled and dried to manufacture an anode. A jelly-roll type electrode assembly was manufactured by winding so that the side on which the anode mixture prepared in Preparation Example 7 was formed was wound so as to be the wound inner side. In a subsequent step, a cylindrical secondary battery was manufactured in the same manner as in Example 1.

Comparative Example 1

The anode mixture prepared in Preparation Example 8 was coated on both sides of a 10 μm-thick copper foil at a loading amount of 4.566 mAh/cm$^2$, and then rolled and dried to manufacture an anode, and a long sheet type separator of polyethylene was interposed between the anode and the cathode manufactured in Example 1, and then wound to manufacture a jelly-roll type electrode assembly. In the subsequent step, a secondary battery was manufactured in the same manner as in Example 1.

Experimental Example 1 (Output Characteristics)

Figure 2:
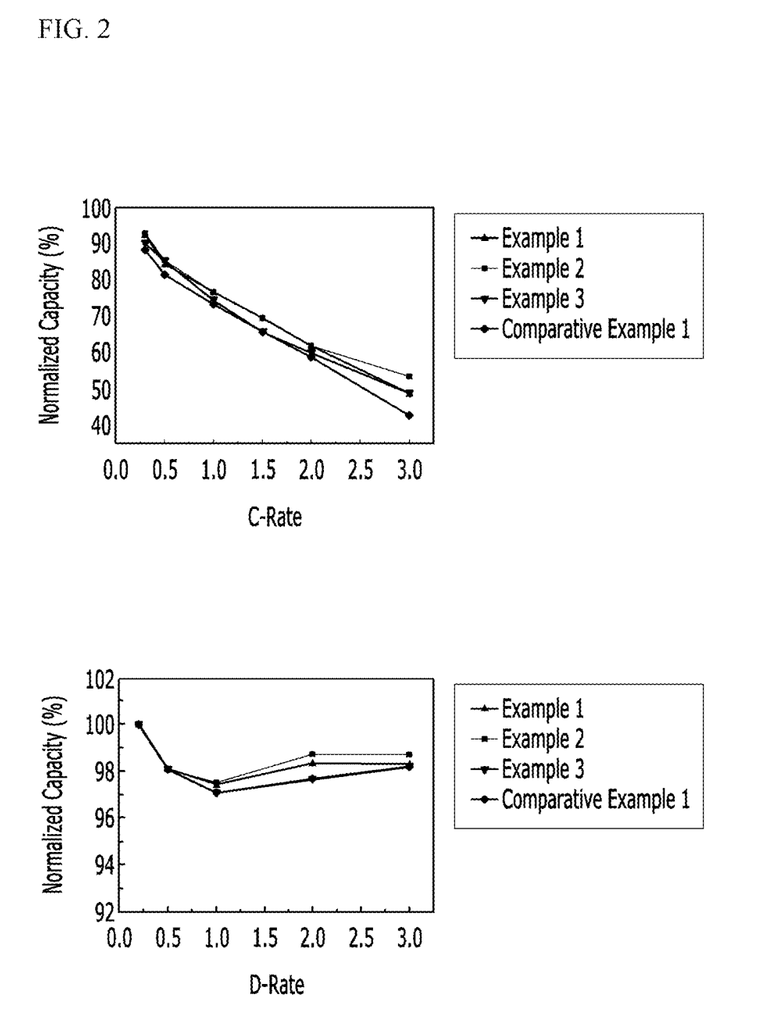
FIG. 2 is a graph showing the results according to Experimental Example 1 of the present disclosure.

Secondary batteries each prepared in Examples 1 to 3 and Comparative Example 1 were activated under a current condition of 0.1 C in a voltage range of 2.5 V to 4.2 V, and then, the capacity by C-rate (charge-rate) and by D-rate (discharge-rate) were measured, and the results are shown in FIG. 2 below.

Referring to FIG. 2, it can be seen that the output characteristics of Examples are superior to those of Comparative Example 1.

Experimental Example 2 (Life Characteristics)

Figure 3:
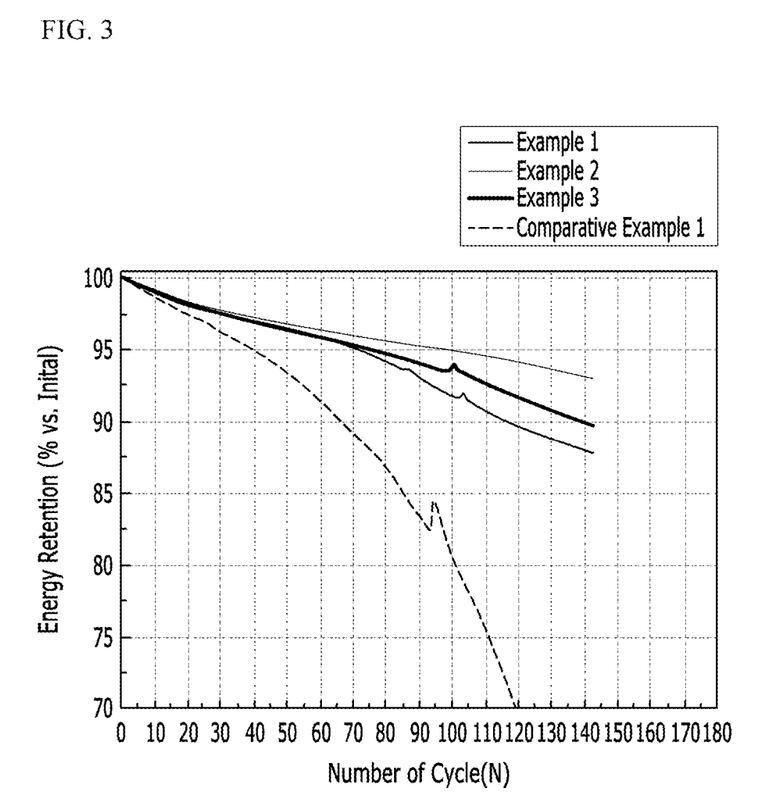
FIG. 3 is a graph showing the results according to Experimental Example 2 of the present disclosure.

The energy of the secondary batteries each manufactured in Examples 1 to 3 and Comparative Example 1 was measure by repeating 140 cycles under a condition of 1.0 C in a voltage range of 2.5V to 4.2V, and the energy retention rate (%) was measured compared to the initial cycle, and results are shown in FIG. 3 below.

Here, the energy is the value obtained by multiplying the capacity by the average discharge voltage of the battery.

Referring to FIG. 3, it appears that the energy retention rate of Examples 1 to 3 is more excellent than that of Comparative Example 1

Experimental Example 3

Figure 4:
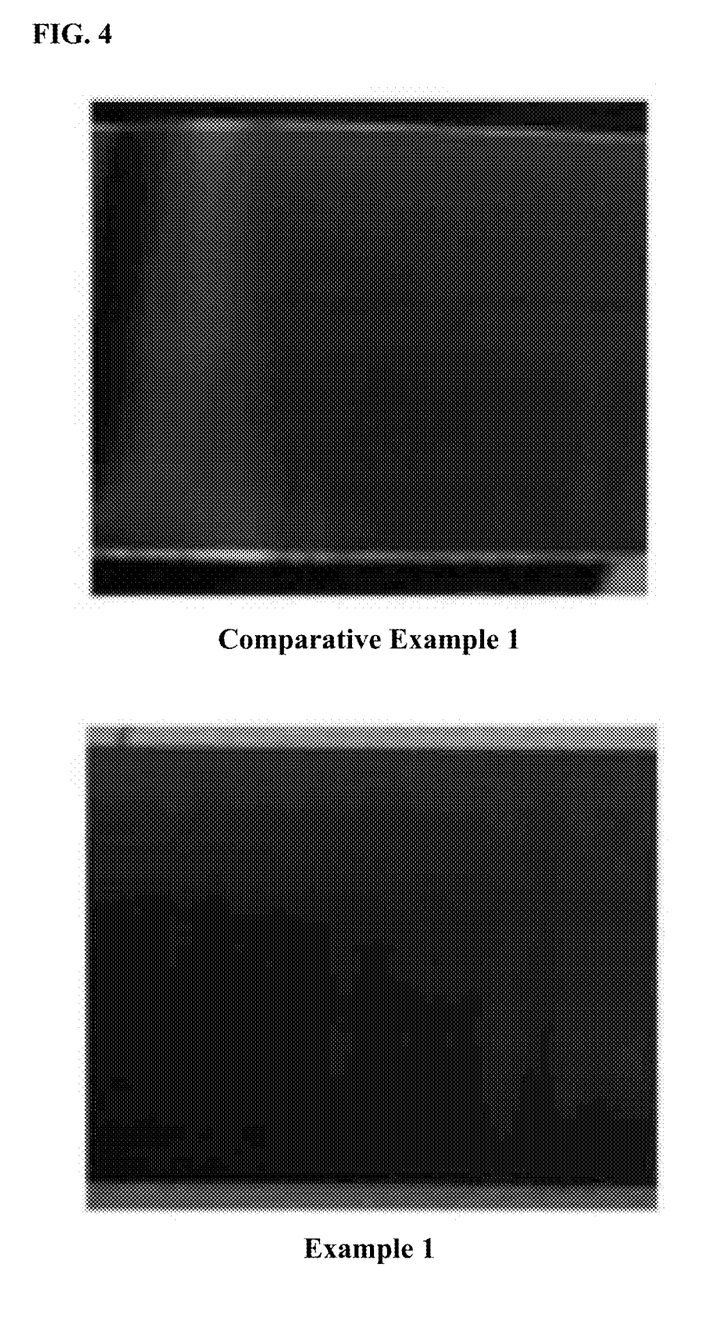
FIG. 4 is a photograph showing the results according to Experimental Example 3 of the present disclosure

After 100 cycles have passed in Experimental Example 2, the secondary battery of Example 1 and the secondary battery of Comparative Example 1 were disassembled and the detachment of the anode mixture from the anode was confirmed, and the resulting photograph is shown in FIG. 4 below.

Referring to FIG. 4, in the case of Comparative Example 1, it can be confirmed that the mixture was detached from the anode at both side edges in the longitudinal direction. It was photographed on a black background so that the detached part could be clearly seen.

On the other hand, in the case of Example 1, it can be confirmed that the anode mixture is not detached from the anode.

Based on the above disclosure, this is to be understood by those of ordinary skill in the art that various applications and modifications can be made within the scope of the present disclosure.

The invention claimed is:

1. A jelly-roll electrode assembly comprising a sheet-cathode, a sheet-anode, and a separator interposed between the cathode and the anode, which are rolled around the cathode to form the jelly-roll electrode assembly,
wherein the anode comprises an anode current collector, a first anode mixture disposed on a first side of the anode current collector, and a second anode mixture disposed on a second side of the anode current collector, which is opposite from the first side, such that the first anode mixture is disposed to be directly opposite to the second anode mixture,
the first side of the anode current collector is a side that is closer to a center of the jelly-roll electrode assembly, the second side of the anode current collector is a side that is closer to an outer surface of the jelly-roll electrode assembly, the first anode mixture includes an active material of artificial graphite and natural graphite, wherein the first anode mixture contains more artificial graphite than natural graphite, and the second anode mixture includes an active material of artificial graphite and natural graphite, wherein the second anode mixture contains more natural graphite than artificial graphite.

2. The jelly-roll electrode assembly of claim 1, wherein the active material contained in the first anode mixture and the second anode mixture is consist essentially of natural graphite and artificial graphite.

3. The jelly-roll electrode assembly of claim 1, wherein a N/P ratio of the electrode assembly is ≥1, wherein the N/P ratio is a capacity ratio per unit area of the anode and the cathode.

4. The jelly-roll electrode assembly of claim 1, wherein at least one of the first side or the second side of the anode contains an uncoated portion to which the first or second anode mixture is not coated on the anode current collector, and an anode tab is attached to the uncoated portion.

5. The jelly-roll electrode assembly of claim 1, wherein the cathode has a capacity per unit area of the cathode mixture formed on one side of the cathode current collector from 4.300 mAh/cm² to 4.400mAh/cm², and the anode has a capacity per unit area of the anode mixture formed on one side of the anode current collector from 4.500 mAh/cm² to 4.600mAh/cm².

6. The jelly-roll electrode assembly of claim 1, wherein the first anode mixture and the second anode mixture include a conductive material and a binder.

7. The jelly-roll electrode assembly of claim 6, wherein the conductive material and the binder are contained in each of the first and second anode mixtures in an amount of 1% by weight to 3% by weight based on the total weight of the first or second anode mixture.

8. The jelly-roll electrode assembly of claim 1, wherein the cathode is configured such that a cathode mixture including a cathode active material, a conductive material, and a binder is formed on both side of a cathode current collector, respectively.

9. The jelly-roll electrode assembly of claim 8, wherein the conductive material and the binder are contained in each cathode mixture in an amount of 1% by weight to 3% by weight based on the total weight of the cathode mixture.

10. The jelly-roll electrode assembly of claim 8, wherein an uncoated portion to which the cathode mixture is not coated is formed on either one side or both sides of the cathode current collector, and a cathode tab is attached to the uncoated portion.

11. The jelly-roll electrode assembly of claim 1, wherein the active material of the first anode mixture contains artificial graphite and natural graphite in a ratio of 61 to 99 wt %: 1 to 39 wt % on a weight basis, and the active material of the second anode mixture contains artificial graphite and natural graphite in a ratio of 1 to 39 wt %: 61 to 99 wt % on a weight basis.

12. The jelly-roll electrode assembly of claim 11, wherein the active material of the first anode mixture contains artificial graphite and natural graphite in the ratio of 70 to 99 wt %: 1 to 30 wt % on the weight basis, and the active material of the second anode mixture contains artificial graphite and natural graphite in the ratio of 1 to 30 wt %: 70 to 99 wt % on the weight basis.

13. The jelly-roll electrode assembly of claim 12, wherein the active material of the first anode mixture contains artificial graphite and natural graphite in the ratio of 75 to 85 wt %: 15 to 25 wt % on the weight basis, and the active material of the second anode mixture contains artificial graphite and natural graphite in the ratio of 15 to 25 wt %: 75 to 85 wt % on the weight basis.

14. A secondary battery having a structure in which the jelly-roll electrode assembly according to claim 1 is mounted in a cylindrical or prismatic metal battery case in a state of being impregnated with a lithium-containing non-aqueous electrolyte.

15. A secondary battery of claim 14, wherein the secondary battery is a lithium secondary battery.

* * * * *